No. 644,597. Patented Mar. 6, 1900.
C. G. GUYER & G. K. RUDERT.
EMBROIDERY FRAME.
(Application filed June 3, 1899.)

(No Model.)

WITNESSES:
Mamie Leonard.
Henry C. Johnson.

INVENTORS
Charles G. Guyer
George K. Rudert
BY
Hensey & Robinson
ATTORNEY

UNITED STATES PATENT OFFICE.

CHARLES G. GUYER AND GEORGE K. RUDERT, OF WILMINGTON, DELAWARE.

EMBROIDERY-FRAME.

SPECIFICATION forming part of Letters Patent No. 644,597, dated March 6, 1900.

Application filed June 3, 1899. Serial No. 719,223. (No model.)

*To all whom it may concern:*

Be it known that we, CHARLES G. GUYER and GEORGE K. RUDERT, citizens of the United States, residing at Wilmington, in the county of New Castle and State of Delaware, have invented certain new and useful Improvements in Embroidery-Frames; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to an improvement in embroidery-frames; and it consists in an inner ring, which is made expansible inside of the outer one, combined with a plate which is secured to one end of the inner ring and carries a pivoted lever, and a second slotted plate provided with a shoulder secured to the other end, as will be more fully described hereinafter.

The object of our invention is to provide an embroidery-ring in which the inner ring is made expansible and the lever for operating the ring is attached to the inner ring, so that while in use the lever will extend in a line with the ring, and thus be entirely concealed inside of the piece being embroidered and out of the way and where it will only be touched by the operator when it is desired to expand the inner ring tightly against the other one or where the inner ring is to be collapsed for the purpose of removing the embroidery.

Figure 1:
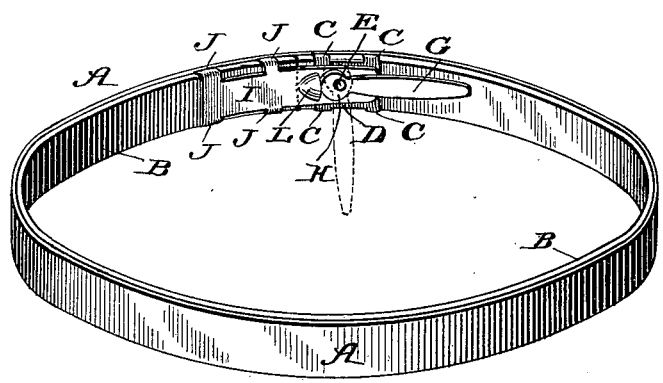
Figure 2:
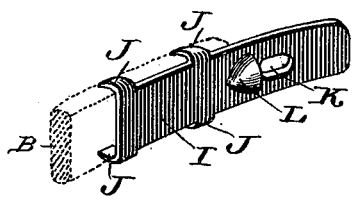
Figure 3:
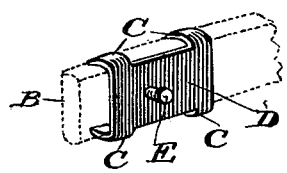

In the accompanying drawings, Figure 1 is a perspective view of the rings to which our invention is applied, the lever being shown extending at an angle to the two rings in dotted lines and in a line with the rings in solid lines. Figs. 2 and 3 represent detached views of the two plates.

A represents the outer ring, which is made of but a single piece, and B represents the expanding ring, which is placed inside of the one A and which is divided at one side, so that it can be opened and closed inside of the outer one, according as it is to be expanded, for the purpose of holding the embroidery in position or contracted for removal.

Secured to one end of the inner ring is a metallic plate D, which is provided with a series of lips C, which are bent over the edges of the ring, and through which plate and ring extends a headed stud or pivot E, upon which is placed the partially-turning lever G, provided with a cam H upon its inner end. This lever is made of any desired length, and when the cam is not brought into use the lever stands at a right angle to the two rings, as shown in dotted lines; but when the inner ring is expanded within the outer one the lever extends horizontally in a line with the two rings, as shown.

Secured to the outer end of the inner ring is a plate I, which is provided at its inner end with the lips J, which catch over the end of the ring and secure the plate rigidly in position. The outer end of this ring is provided not only with a slot K, but with a shoulder L, and this slotted shouldered end of the plate extends over the outer surface of the plate D sufficiently far to allow the pivot to pass through the slot. The shoulder is formed at the end of the slot, so that when the lever is brought into line with the hoop the cam will strike against the shoulder and force the two ends of the inner ring apart, and thus cause it to expand inside of the outer one.

Heretofore the outer ring has been made adjustable in relation to the inner one for the purpose of clamping the embroidery in place and the expanding device placed upon the outer ring, where it projects outwardly in the way of the operator. Our invention differs from this in having the inner ring made expansible and having the expanding lever attached directly to one of its ends, so that when in use it is entirely out of the way and the operator can use every part of the frame alike without any danger of having the hands injured or thread caught by projecting parts.

Having thus described our invention, we claim—

1. In an embroidery-frame, a non-expansible outer ring, an expansible inner one divided at one side, a shouldered slotted plate secured to one end of the inner ring, and a cam-lever secured to the other end, substantially as shown and described.

2. In an embroidery-frame, a non-expansible outer ring, and an expansible inner one divided at one side, combined with the plate D applied to one end of the ring, a pivot projecting from the plate, a cam-lever placed upon the pivot, and a slotted shouldered plate applied to the opposite end of the inner divided ring, and against which the cam operates, for the purpose of expanding the inner ring, substantially as specified.

In testimony whereof we affix our signatures in presence of two witnesses.

CHARLES G. GUYER.
   GEORGE K. RUDERT.

Witnesses:
 EDWARD G. COOK,
 WM. D. MULLEN, Jr.